US012039032B2

United States Patent
Leplus et al.

(10) Patent No.: US 12,039,032 B2
(45) Date of Patent: Jul. 16, 2024

(54) METHOD FOR THE EXECUTION OF A BINARY CODE BY A MICROPROCESSOR

(71) Applicant: Commissariat à l'Energie Atomique et aux Energies Alternatives, Paris (FR)

(72) Inventors: Gaëtan Leplus, Grenoble (FR); Olivier Savry, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 49 days.

(21) Appl. No.: 17/656,039

(22) Filed: Mar. 23, 2022

(65) Prior Publication Data

US 2022/0358206 A1 Nov. 10, 2022

(30) Foreign Application Priority Data

May 10, 2021 (FR) ...................... 21 04897

(51) Int. Cl.
G06F 21/52 (2013.01)

(52) U.S. Cl.
CPC ........ G06F 21/52 (2013.01); *G06F 2221/033* (2013.01)

(58) Field of Classification Search
CPC ........ G06F 21/52; G06F 21/54; G06F 21/566; G06F 2221/033
See application file for complete search history.

(56) References Cited

U.S. PATENT DOCUMENTS

2009/0126029 A1 5/2009 Benoit et al.
2013/0279429 A1* 10/2013 Magne ................ H04H 20/72
370/329

(Continued)

FOREIGN PATENT DOCUMENTS

CN 105739951 A * 7/2016
EP 3 736 719 A1 11/2020
WO WO 2007/010009 A2 1/2007

OTHER PUBLICATIONS

French Preliminary Search Report Issued Nov. 25, 2021 in French Application 21 04897 filed on May 10, 2021(with English Translation of Categories of Documents & Written Opinion), 11 pages.

(Continued)

*Primary Examiner* — Daniel B Potratz
(74) *Attorney, Agent, or Firm* — Oblon, McClelland, Maier & Neustadt, L.L.P.

(57) ABSTRACT

A method of executing machine code using a microprocessor includes, for each datum $D_i$, computing a code $C_i$ using a relationship $C_i = Q_\alpha(D_i) = P \circ F_\alpha(D_i)$, where P is a predetermined function, $F_\alpha$ is a function defined by the following relationship: $F_\alpha(D_i) = T_{\alpha r} \circ \ldots \circ T_{\alpha r} \circ \ldots \circ T_{\alpha 1} \circ T_{\alpha 0}(D_i)$, and $T_{\alpha r}$ is a conditional transposition, configured by a secret parameter αr, that permutes two blocks $B1_r$ and $B2_r$ of bits of the datum $D_i$ on the basis of the value of the parameter αr. The method also includes computing a code $C_{res-t}$ using the following relationship: $C_{res-t} = C_1 \& C_2 \& \ldots \& C_n$, where $C_1$ to $C_n$ are the codes associated with data $D_1$ to $D_n$ combined with one another by a Boolean operation $D_1 \& D_2 \& \ldots \& D_n$, where the "&" symbol designates the Boolean operation.

10 Claims, 3 Drawing Sheets

(56) References Cited

U.S. PATENT DOCUMENTS

| | | | | |
|---|---|---|---|---|
| 2019/0080096 A1* | 3/2019 | Savry | ...................... | G06F 21/44 |
| 2020/0302067 A1* | 9/2020 | Savry | ...................... | G06F 9/223 |
| 2020/0349294 A1* | 11/2020 | Savry | .................. | G06F 9/30054 |
| 2021/0182175 A1* | 6/2021 | Hoogerbrugge | .... | G06F 11/3624 |

OTHER PUBLICATIONS

De Meyer et al., "M&M: Masks and Macs Against Physical Attacks", IACR Transactions on Cryptographic Hardware and Embedded Systems ISSN, vol. 2019, No. 1, DOI:10.13154/tches.v2019. i1.25-50, Nov. 9, 2018, 26 Pages.

Kiaei et al., "SKIVA: Flexible and Modular Side-Channel and Fault Countermeasures", IACR, International Association for Cryptologic Research, vol. 20190702:141841, Jul. 2, 2019, 38 Pages.

* cited by examiner

METHOD FOR THE EXECUTION OF A BINARY CODE BY A MICROPROCESSOR

The invention relates to a method for the execution of a binary code by a microprocessor. The invention also relates to a hardware security module for implementing this execution method.

Numerous attacks are possible in order to obtain information about a binary code or cause unexpected operation of the binary code. For example, attacks known under the name "fault injection" or "fault attack" may be implemented. These attacks involve disrupting the operation of the microprocessor or the memory containing the binary code, using various physical means such as modifying supply voltages, modifying the clock signal, exposing the microprocessor to electromagnetic waves, inter alia.

Using such attacks, an attacker is able to alter the integrity of machine instructions or data in order for example to recover a secret key of a cryptographic system, bypass security mechanisms such as checking of a PIN code during authentication, or simply prevent the execution of a function essential to the security of a critical system.

These attacks may in particular cause three types of fault, called execution faults, when the binary code is executed:
1) altering the instructions of the machine code that is executed,
2) altering the data stored in the main memory or in registers of the microprocessor, and
3) altering the control flow of the machine code.

The control flow corresponds to the execution path that is followed when the machine code is executed. The control flow is conventionally depicted in the form of a graph, known under the name "control flow graph".

To detect such execution faults, it has already been proposed to associate an error correction code with each datum processed by the microprocessor. Next, the error correction code associated with the result of the instruction that processes these data is computed from the error correction codes of the processed data. In this way, if a fault occurs when this instruction is executed, the result that is obtained does not correspond to the computed error correction code. This allows this fault to be detected. Such a solution is for example disclosed in application FR3071082. The algorithm for constructing the error correction code associated with a datum is known. It is therefore possible for an attacker to inject faults in order to modify the error correction code computed for the result so that it corresponds to the faulted result. In this case, the execution fault is not detected.

To overcome the above disadvantage, it has been opposed that the error correction code be replaced by an integrity code. This integrity code is constructed from the datum and, in addition, using a secret key known only to the microprocessor. It is thus difficult for attackers to modify an integrity code so that it corresponds to a faulted result, because they do not know the secret key. However, it should always be possible to construct the integrity code for the result using the integrity codes associated with the processed data and without using the result of the instruction executed by the arithmetic logic unit. For example, such a solution is described in the following article: L. De Meyer, V. Arribas, S. Nikova, V. Nikov and V. Rijmen: "M&M: Masks and Macs against physical attacks", IACR Transactions on Cryptography Hardware and Embedded Systems, pages 25-50, 2019. This article is subsequently designated by the term "DEMEYER2019". The method described in this article for computing the integrity code for the result from the integrity codes of the processed data is complex. The reason is that it does this by using multiplications in a Galois field. It is therefore difficult to implement this method in a microprocessor, including in the case of Boolean operations.

Prior art is also known from EP3736719A1, and from the following article: PANTEA KIAEI et AL: "SKIVA: Flexible and Modular Side-channel and Fault Countermeasures", IACR, Feb. 7, 2019, pages 1-38. Application EP3736719A1 does not describe any method for securing against fault injection attacks. The article by PANTEA KIAEI et Al describes methods for securing against fault injection attacks using spatial redundancy and temporal redundancy.

The aim is to propose a method for executing a binary code that exhibits the same security level, in the case of Boolean operations, as that described in the article by DEMEYER2019, but that is easier to implement.

One subject of the invention is therefore such a method for executing a binary code.

Another subject of the invention is a hardware security module for implementing the claimed method.

The invention will be better understood on reading the following description, which is given solely by way of non-limiting example, with reference to the drawings, in which.

SECTION I: CONVENTIONS, NOTATIONS AND DEFINITIONS

In the figures, the same references have been used to designate elements that are the same. In the res-t of this description, features and functions that are well known to those skilled in the art will not be described in detail.

In this description, the following definitions have been adopted.

A "program" designates a set of one or more predetermined functions that it is desired to have executed by a microprocessor.

A "source code" is a representation of the program in a computer language, not being able to be executed directly by a microprocessor and being intended to be transformed, by a compiler, into a machine code able to be executed directly by the microprocessor.

A program or a code is said to be "able to be executed directly" or "directly executable" when it is able to be executed by a microprocessor without this microprocessor needing to compile it beforehand by way of a compiler or to interpret it by way of an interpreter.

An "instruction" designates a machine instruction able to be executed by a microprocessor. Such an instruction consists:
  of an opcode, or operation code, that codes the nature of the operation to be executed, and
  of one or more operands defining the one or more values of the parameters of this operation.

A "machine code" is a set of machine instructions. It is typically a file containing a sequence of bits with the value "0" or "1", these bits coding the instructions to be executed by the microprocessor. The machine code is able to be executed directly by the microprocessor, that is to say without the need for a preliminary compilation or interpretation.

A "binary code" is a file containing a sequence of bits with the value "0" or "1". These bits code data and instructions to be executed by the microprocessor. The binary code thus comprises at least one machine code and also, in general, digital data processed by this machine code.

The expression "execution of a function" is understood to designate execution of the instructions making up this function.

A block of bits of a datum or of a variable is a group of consecutive bits of this datum or of this variable.

The size of a block of bits is equal to the number of bits contained in this block.

The following notations are used to designate Boolean operations:
- the "OR" logic operation is designated by the symbol "+",
- the "EXCLUSIVE-OR" logic operation is designated by the symbol "XOR",
- the "AND" logic operation is designated by the symbol ".",
- the "NOT" Boolean operation is designated by the symbol "⁻" placed after the variable for which the complement is computed.

SECTION II: ARCHITECTURE OF THE APPARATUS

Figure 1:
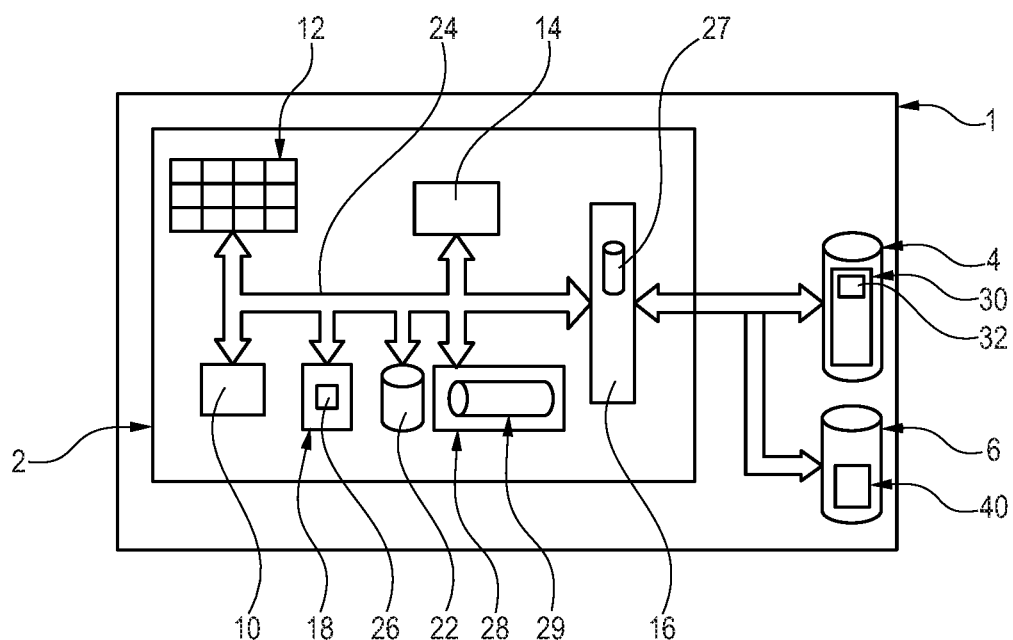
FIG. 1 is a schematic illustration of the architecture of an electronic apparatus capable of executing a binary code.

FIG. 1 shows an electronic apparatus 1 comprising a microprocessor 2, a main memory 4 and a mass storage medium 6. For example, the apparatus 1 is a computer, a smartphone, an electronic tablet, a chip card or the like.

The microprocessor 2 here comprises:
an arithmetic logic unit 10;
a set 12 of registers;
a control module 14;
a data input/output interface 16,
an instruction loader 18 having a program counter 26,
a queue 22 of instructions to be executed, and
a hardware security module 28.

The memory 4 is configured to store instructions of a binary code 30 of a program to be executed by the microprocessor 2. The memory 4 is a random access memory. The memory 4 is typically a volatile memory. The memory 4 may be a memory external to the microprocessor 2, as shown in FIG. 1. In this case, the memory 4 is formed on a substrate that is mechanically separate from the substrate on which the various elements of the microprocessor 2, such as the unit 10, are formed.

By way of illustration, the binary code 30 in particular comprises a machine code 32 of a secure function. Each secure function corresponds to a set of several lines of code, for example several hundred or thousand lines of code, stored at successive addresses in the memory 4. Each line of code corresponds here to a data word. A line of code is thus loaded to a register of the microprocessor 2 in a single read operation. Likewise, a line of code is written to the memory 4 by the microprocessor 2 in a single write operation. Each line of code codes either a single instruction or a single datum.

By way of illustration, the microprocessor 2 conforms with the reduced-instruction-set computer (RISC) architecture.

The loader 18 loads the next instruction to be executed by the unit 10 into the queue 22 from the memory 4. More precisely, the loader 18 loads the instruction to which the program counter 26 points. To this end, the queue 22 comprises a succession of multiple registers.

The unit 10 is in particular configured to execute the instructions loaded into the queue 22 one after another. The instructions loaded into the queue 22 are generally systematically executed in the order in which these instructions were stored in this queue 22. The unit 10 is also capable of storing the result of these executed instructions in one or more of the registers of the set 12.

In this description, "execution by the microprocessor 2" and "execution by the unit 10" will be used synonymously.

The module 14 is configured to move data between the set 12 of registers and the interface 16. The interface 16 is in particular able to acquire data and instructions, for example from the memory 4 and/or the medium 6 that are external to the microprocessor 2. To accelerate transfers of data and instructions between the microprocessor 2 and the memory 4 here, the interface 16 comprises one or more cache memories. To simplify FIG. 1, only one cache memory 27 is shown. This cache memory 27 is used to temporarily store the data processed by the microprocessor 2 on the same chip as the unit 10.

The module 28 is capable of automatically executing the various operations described in detail in the sections that follow in order to secure the execution of the Boolean operations by the unit 10. The module 28 operates independently and without using the unit 10. It is thus capable of processing the lines of code before and/or after they are processed by the unit 10. To this end, it comprises in particular a secure non-volatile memory 29. There is no provision to access this memory 29 without passing via the module 28. In this embodiment, the module 28 is configured to execute operations such as the following operations:
checking an integrity code,
constructing an integrity code from a datum,
constructing the integrity code for a result from integrity codes of the processed data.

The memory 29 is used to store the secret information required for the operation of the module 28. Here, it therefore in particular comprises a pre-stored secret key α.

In this exemplary embodiment, the set 12 comprises general registers able to be used to store any type of data. The size of each of these registers is sufficient to store a datum or a result and the integrity code associated therewith.

A data interchange bus 24 that connects the various components of the microprocessor 2 to one another is shown in FIG. 1 in order to indicate that the various components of the microprocessor are able to interchange data with one another.

The medium 6 is typically a non-volatile memory. It is for example an EEPROM or Flash memory. Here, it contains a backup copy 40 of the binary code 30. It is typically this copy 40 that is automatically copied to the memory 4 to res-tore the code 30, for example after a power failure or the like or just before the execution of the code 30 starts.

SECTION III—SECURING THE BOOLEAN OPERATIONS

In this section, "logic instruction" is used to designate an instruction of the set of instructions of the microprocessor 2 that, when it is executed by the unit 10, stores the result of a Boolean operation in a register $R_{res-p}$ of the microprocessor.

The registers in which the one or more data to be processed are stored are typically identified by one or more operands of the logic instruction. Likewise, the register $R_{res-p}$ in which the result $D_{res-p}$ of the logic instruction needs to be stored may also be identified by an operand of this logic instruction.

The opcode of the logic instruction identifies the Boolean operation to be executed by the unit 10 in order to modify or combine the one or more data $D_1$ to $D_n$.

The "&" symbol is used below to generically designate a Boolean operation.

Thus, the notation $D_1 \& D_2 \& \ldots \& D_n$ generically designates a Boolean operation executed by the microprocessor 2 between the data $D_1$ to $D_n$.

If n=1, the Boolean operation is the complement operation also known by the name "NOT". If n is greater than or equal to two, the Boolean operation is chosen from the group made up of the following Boolean operations and their composition:
- the "OR" logic operation,
- the "EXCLUSIVE-OR" logic operation,
- the "AND" logic operation.

By injecting faults while the unit 10 is operating, it is possible to disrupt its operation so that the result of the execution of the logic instruction does not correspond to that expected. The unit 10 is then said to have been caused to malfunction.

This section describes a solution for detecting such a malfunction of the unit 10. Here, this solution is described in a simplified case in which it is implemented only for Boolean operations. The execution of the other arithmetic operations is not secured in this embodiment.

The registers $R_1$ to $R_n$ and the register $R_{res-p}$ are for example registers of the set 12 of the microprocessor 2.

The size, in number of bits, of each datum $D_1$, $D_2$ and $D_{res-p}$ is equal to $2^d$, where d is an integer typically greater than four or five. For example, here, d=5.

Figure 2:
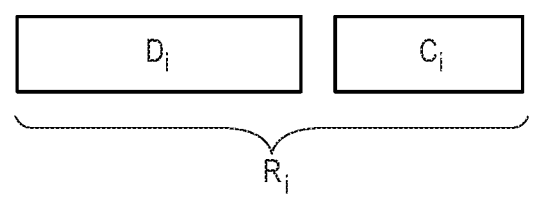
FIG. 2 is a schematic illustration of the structure of a register of the apparatus of FIG. 1, FIGS. 3 to 5 are schematic illustrations of various possible implementations of a function $F_\alpha$ executed by the apparatus of FIG. 1.

The structures of the registers $R_1$, $R_2$ and $R_{res-p}$ are identical and shown in the specific case of the register $R_i$ in FIG. 2. The register $R_i$ comprises:
- a 32-bit range containing the datum $D_i$,
- a range containing an integrity code $C_i$ allowing the integrity and the authenticity of the datum $D_i$ to be checked.

The code $C_i$ is generated by the module 28 using a pre-programmed relationship defined generically by the following relationship: $C_i = Q_\alpha(D_i)$, where:
- the index i identifies a register among the registers $R_1$, $R_2$ and $R_{res-p}$, and
- the function $Q_\alpha$ is a function pre-programmed in the module 28 and configured by the secret key a.

The function $Q_\alpha$ is defined by the following relationship: $Q_\alpha(D_i) = P \circ F_\alpha(D_i)$, where the symbol "o" designates the function-composition operation. The function P is a predetermined function. In the first embodiments described below, the function P is the identity function. Thus, in these first embodiments, the function $Q_\alpha$ is equal to the function $F_\alpha$. Examples where the function P is different from the identity function are given in the section dealing with variants.

The function $F_\alpha$ is a homomorphism of a set A equipped with the "&" Boolean operation towards a set B equipped with the same "&" Boolean operation such that $F_\alpha(D_1 \& D_2) = F_\alpha(D_1) \& F_\alpha(D_2)$, specifically for all "&" Boolean operations. Here, the sets A and B are each the set of numbers able to be coded on 32 bits, that is to say the set of possible data $D_1$ and $D_2$. Thus, using the notations introduced earlier, the function $F_\alpha$ is such that for any & Boolean operation, it is possible to simply compute the integrity code $C_{res-t}$ associated with the result $D_{res-p}$ of the Boolean operation $D_1$ & $D_2$ using the following relationship $C_{res-t} = C_1$ & $C_2$. When the Boolean operation that is executed is the complement operation of the datum $D_1$, it is also possible to compute the code $C_{res-t-t}$ associated with the result $D_{res-p}$ using the following relationship $C_{res-t-t} = C_1'$, where the symbol "'" designates the complement operation that returns a "1" when $D_1 = 0$ and that returns "0" when $D_1 = 1$.

The function $F_\alpha$ is defined by the following generic relationship: $F_\alpha(D_i) = T_{\alpha t} \circ \ldots \circ T_{\alpha r} \circ \ldots T_{\alpha 1} \circ T_{\alpha 0}(D_i)$, where:
- $T_{\alpha r}$ is a transposition, configured by the parameter $\alpha_r$, that permutes only two blocks of bits $B1_r$ and $B2_r$ of the datum $D_i$ when the parameter $\alpha_r$ is equal to a first value and that does not permute these two blocks of bits when the parameter $\alpha_r$ is equal to a second value,
- the index r is an identifier of the transposition $T_{\alpha r}$ and of the parameter $\alpha_r$,
- the symbol "o" designates the function-composition operation,
- "t" is an integer greater than one and, typically, greater than $2^{d-1}$, and
- the bits of the parameters $\alpha_0$ to $\alpha_t$ form the secret key $\alpha$.

Here, the first value is the value "1" and the second value is the value "0". The blocks $B1_r$ and $B2_r$ may each contain one or more bits.

It is possible to find numerous suitable functions $F_\alpha$. Below, by way of illustration, several examples of possible functions $F_\alpha$ are given.

Figure 3:
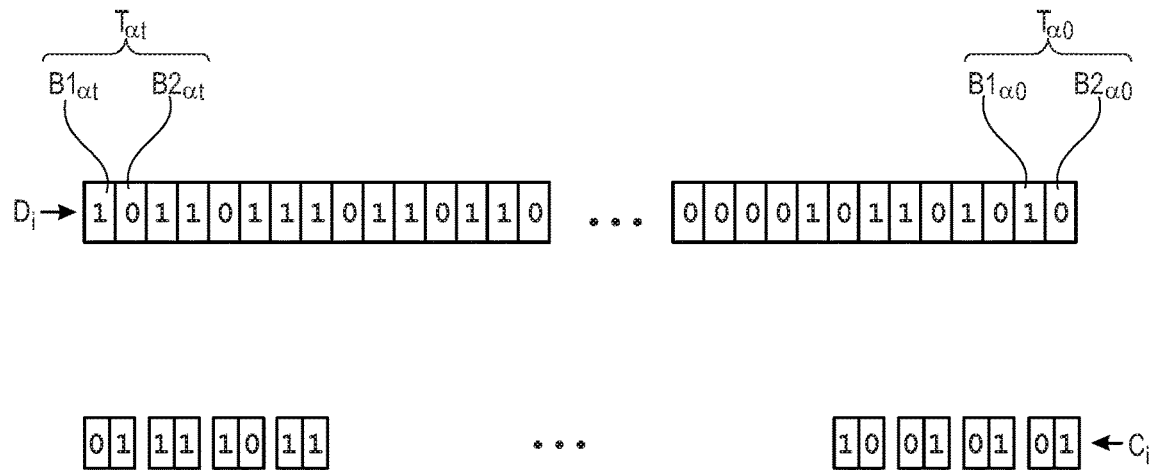

A first example of a function $F_\alpha$ is described with reference to FIG. 3. In this first example, the blocks $B1_r$ and $B2_r$ each contain just one bit. In this case, the transposition $T_{\alpha r}$ is performed for example by a Fredkin logic gate that receives the blocks $B1_r$ and $B2_r$ and the parameter $\alpha_r$ at input and that delivers the doublet $(B1_r, B2_r)$ at output if $\alpha_r = 0$ and delivers $(B2_r, B1_r)$ if $\alpha_r = 1$. In addition, the blocks $B1_r$ and $B2_r$ are different from the blocks permuted by all of the other transpositions of the function $F_\alpha$. Thus, all of the transpositions $T_{\alpha r}$ of the function $F_\alpha$ may be executed in parallel. Here, the blocks $B1_r$ and $B2_r$ are consecutive bits of the datum $D_i$. The blocks $B1_r$ and $B2_r$ are classified in ascending order of the index r in FIG. 3. In FIG. 3, the symbol " . . . " indicates that only some of the bits of the datum $D_i$ and of the code $C_i$ are shown. In this figure, each bit is represented by its value "0" or "1". The line below the datum $D_i$ represents the code $C_i$ obtained by applying this function $F_\alpha$ when all of the parameters $\alpha_r$ are equal to "1". In this particular case, each transposition $T_{\alpha r}$ permutes the blocks $B1_r$ and $B2_r$.

A second example is described with reference to FIG. 4. In this second example, the function $F_\alpha$ is defined by the following relationship: $F_\alpha(D_i) = E_0 \circ \ldots \circ E_q \circ \ldots \circ E_{NbE-1}(D_i)$, where each function $E_q$ is a stage of transpositions and q is the order number of this stage between zero and NbE−1. NbE is the number of stages of transpositions. NbE is an integer greater than one. In this embodiment, NbE is greater than d. Here, in FIG. 4, NbE=6 and d=4.

Each stage $E_q$ of transpositions is defined by the following relationship: $E_q(x) = T_{\alpha m,q} \circ \ldots \circ T_{\alpha j,q} \circ \ldots \circ T_{\alpha 1,q} \circ T_{\alpha 0,q}(x)$, where:
- x is a variable whose size, in number of bits, is equal to the size of the datum D
- $T_{\alpha j,q}$ is a transposition, configured by the parameter $\alpha_{j,q}$, that permutes two blocks of bits $B1_{j,q}$ and $B2_{j,q}$ of the variable x when the parameter $\alpha_{j,q}$ is equal to "1" and that does not permute these two blocks of bits when the parameter $\alpha_{j,q}$ is equal to "0",
- "m+1" is the total number of transpositions $T_{\alpha j,q}$ of the stage $E_q$, "j" is an order number identifying the position of the transposition $T_{\alpha j,q}$ with respect to the other transpositions of the stage $E_q$.

In this example, whatever the value of "q" and whatever the value of "j", the blocks of bits $B1_{j,q}$ and $B2_{j,q}$ permuted by the transposition $T_{\alpha j,q}$ when the parameter $\alpha_{j,q}$ is equal to "1" contain just one bit. The blocks $B1_{j,q}$ and $B2_{j,q}$ are not necessarily consecutive and may therefore be separated from one another by another block of bits permuted by another transposition. Each transposition $T_{\alpha j,q}$ is distinguished from all of the other transpositions of the function $F_\alpha$ by the fact that it is the only one that permutes the two blocks $B1_{j,q}$ and $B2_{j,q}$ when the parameter $T_{\alpha j,q}$ is equal to "1". Moreover, the blocks $B1_{j,q}$ and $B2_{j,q}$ of all of the transpositions $T_{\alpha j,q}$ of the same stage $E_q$ are different from one another and do not overlap. Thus, all of the transpositions $T_{\alpha j,q}$ of the stage $E_q$ may be executed in parallel. By contrast, in this example, the stages $E_q$ are executed one after another in descending order of the indices q.

To maximize the entropy of the function $F_\alpha$, for each stage $E_q$, the number m of transpositions is greater than $2^{d-2}$. Preferably, the number m is equal to $2^{d-1}$. In FIG. 4, only some of the transpositions $T_{\alpha j,q}$ of each stage $E_q$ are shown. More precisely, in FIG. 4, a transposition is shown by a horizontal brace that connects the two bits that it permutes.

Figure 5:
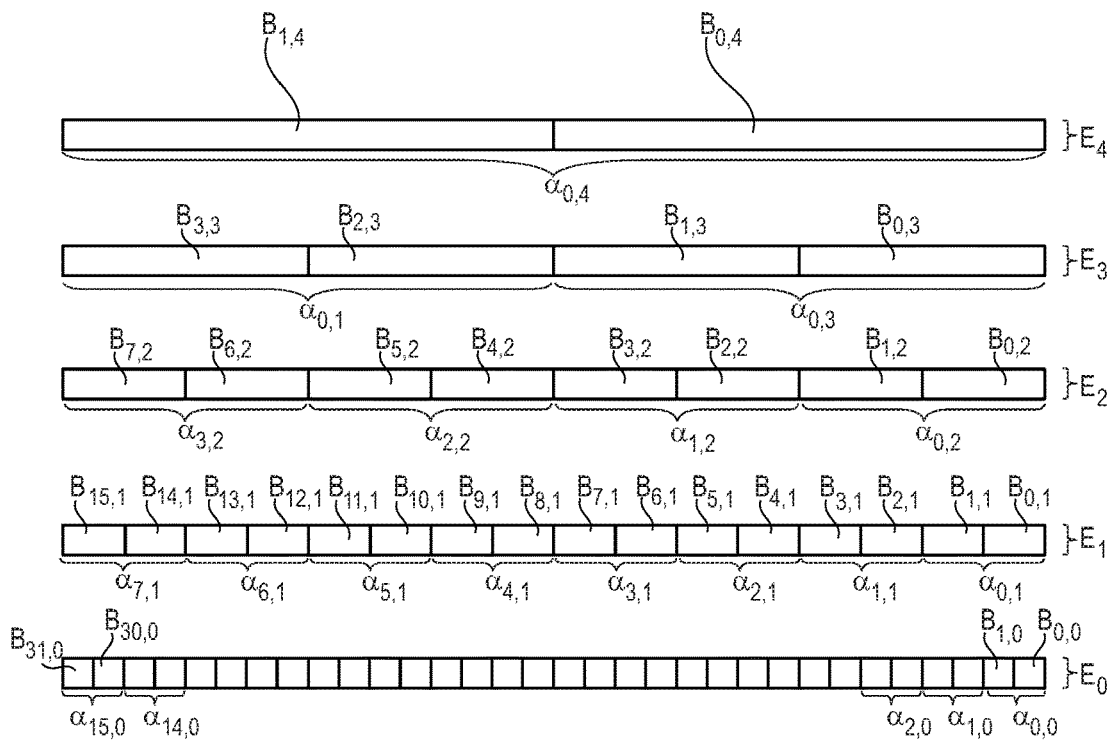

FIG. 5 shows a third example of a function $F_\alpha$. In this third example, the function $F_\alpha$ is also defined by the following relationship: $F_\alpha(D_i)=E_{NbE-1} \circ \ldots \circ E_q \circ \ldots \circ E_1 \circ E_0(D_i)$, where:
each function $E_q$ is a stage of transpositions able to be executed in parallel,
NbE is the number of stages of transpositions, and
the index q is an order number between zero and NbE-1.

The number NbE is greater than one and less than or equal to d. Preferably, the number NbE is equal to d. In FIG. 5, d=5 and NbE=5.

Figure 4:
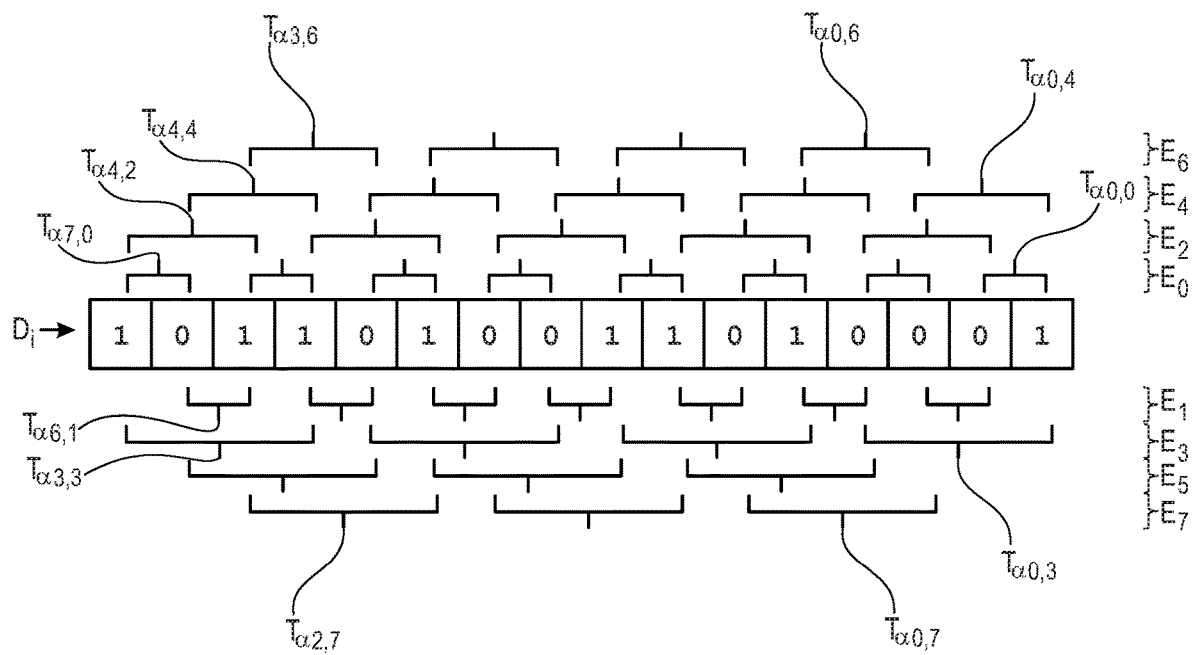

As in the case of FIG. 4, each stage $E_q$ of transpositions is defined by the following relationship: $E_q(x)=T_{\alpha m,q} \circ \ldots \circ T_{\alpha j,q} \circ \ldots \circ T_{\alpha 1,q} \circ T_{\alpha 0,q}(x)$. The definition of the various symbols of the stage $E_q(x)$ is therefore not repeated here.

Each stage $E_q(x)$ of FIG. 5 differs from the stage $E_q(x)$ of FIG. 4 in terms of the following points:
the blocks $B1_{j,q}$ and $B2_{j,q}$ permuted by the transpositions $T_{\alpha j,q}$ are the contiguous blocks $B_{2j+1,q}$ and $B_{2j,q}$,
the size of the blocks $B_{2j+1,q}$ and $B_{2j,q}$ is equal to $2^q$,
the number m of transpositions per stage $E_q$ is equal to $2^{d-q-1}$.

The notations $B_{2j+1,q}$ and $B_{2j,q}$ indicate that these are the (2j+1)-th and 2j-th blocks of $2^q$ bits, respectively, of the variable x. In FIG. 5, the block $B_{0,q}$ is the least significant block of bits, the block $B_{1,q}$ is the following block, and so on. Each horizontal brace in FIG. 5 encompasses the two blocks $B_{2j+1,q}$ and $B_{2j,q}$ of a transposition $T_{\alpha j,q}$ for which the parameter is $\alpha_{j,q}$.

In the case of FIG. 5, for all of the stages $E_q$ for which q is less than NbE-1 and for all of the transpositions $T_{\alpha j,q}$ of this stage, the blocks $B_{2j+1,q}$ and $B_{2j,q}$ are both located within one and the same block $B_{I,q+1}$ of the higher stage $E_{q+1}$, where the index "I" designates the block of the higher stage that contains the blocks $B_{2j+1,q}$ and $B_{2j,q}$. For example, as may be seen in FIG. 5, the blocks $B_{1,q}$ and $B_{0,q}$ of the stage $E_q$ are systematically located within the block $B_{0,q+1}$ of the higher stage $E_{q+1}$. Moreover, here, each block of a higher stage $E_{q+1}$ contains at most two blocks of the lower stage $E_q$.

Figure 6:
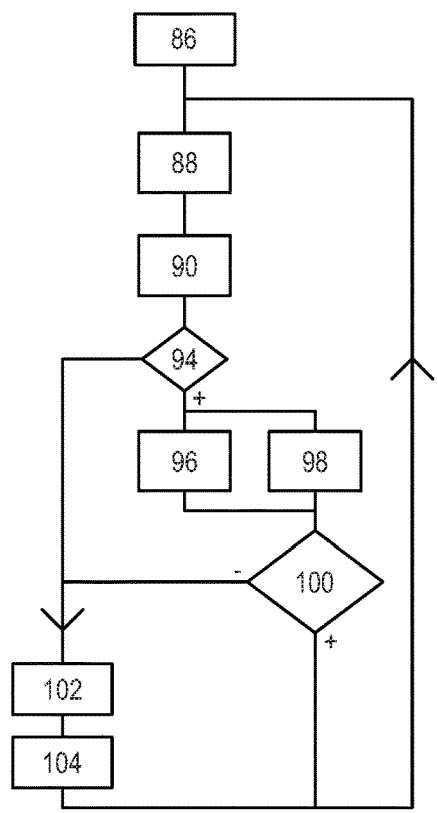
FIG. 6 is a flowchart of a method for the execution of the binary code by the apparatus of FIG. 1.

The operation of the microprocessor 2 in order to secure the execution of Boolean operations will now be described in more detail with reference to FIG. 6. The function $F_\alpha$ implemented to do this is any one of the functions $F_\alpha$ described above.

The method begins by providing, in a step 86, the binary code 30. In this step, in this exemplary embodiment, the binary code 30 is loaded into the memory 4 from the medium 6. Next, execution of the binary code 30 by the microprocessor 2 begins.

In a step 88, each time a datum $D_i$ is stored in the cache memory 27, the module 28 computes the code $C_i$ using the relationship $C_i=F_\alpha(D_i)$. Next, the datum $D_i$ and the code $C_i$ associated therewith are both stored in the memory 27.

Each time an instruction to load a datum into one of the registers $R_i$ is executed by the unit 10, in a step 90, the datum $D_i$ and the code $C_i$ are written to this register $R_i$.

Prior to the execution of a Boolean operation between two data $D_1$ and $D_2$, step 90 is executed once for the datum $D_1$ and once for the datum $D_2$.

Next, each time a logic instruction is about to be executed by the unit 10, just before it is executed, in a step 94, the module 28 checks whether there is an error in the datum $D_i$ contained in the register $R_i$ identified by an operand of the instruction to be executed.

In this step, for each register $R_i$ in question, the module 28 checks, using the code $C_i$ contained in the register $R_i$, whether or not the datum $D_i$ currently stored in this register has an error. For example, this involves the module 28 computing a code $C_i^*$ using the relationship $C_i^*=F_\alpha(D_i)$ and without using the code $C_i$ stored in the register $R_i$. If the code $C_i^*$ computed in this way is identical to the code $C_i$ stored in the register $R_i$, then the integrity and authenticity of the datum $D_i$ are confirmed. In that case, the module 28 detects no error and moves to a step 96. In the opposite case, the module 28 moves to a step 102.

In step 102, the module 28 triggers signalling of an execution fault.

If the module 28 detects no error, in step 96, the microprocessor 2 decodes the instruction and then the unit 10 executes it and stores its result $D_{res-p}$ in the register $R_{res-p}$.

If the executed instruction corresponds to a Boolean operation, in parallel with step 96 or after the execution of step 96, in a step 98, the module 28 computes the code $C_{res-t}$ by using only the codes $C_i$ associated with the data $D_i$ processed by the unit 10 in step 96. Thus, if it is the data $D_1$ and $D_2$ that are processed, the code $C_{res-t}$ is computed by combining the codes $C_1$ and $C_2$ stored in the registers $R_1$ and $R_2$ respectively prior to execution of the logic instruction. More precisely, the module 28 computes the code $C_{res-t}$ using the following relationship: $C_{res-t}=C_1 \& C_2$, where the "&" symbol designates the Boolean operation executed by the unit 10 in step 96.

Next, in a step 100, the module 28 checks whether the computed code $C_{res-t}$ corresponds to the code $C_{res-p}$ defined by the relationship $C_{res-p}=F_\alpha(D_{res-p})$. Here, to do this, the module 28 computes the code $C_{res-p}$ from the result $D_{res-p}$ stored in the register $R_{res-p}$ and by implementing the relationship $C_{res-p}=F_\alpha(D_{res-p})$.

Next, the module 28 compares the computed codes and $C_{res-t}$. If these codes are different, the module 28 triggers the execution of step 102. In the opposite case, this means that the code $C_{res-t}$ corresponds to the code $C_{res-p}$ and therefore that there was no fault during the execution of the logic instruction by the unit 10. In this last case, no signalling of an execution fault is triggered and the method continues with the execution of the next instruction in the queue 22.

The execution of steps 98 and 100 allows a malfunction in the unit 10 to be detected, because the computed codes $C_{res-p}$ and $C_{res-t}$ are identical only if the unit 10 has correctly executed the "&" operation. This is explained by the following relationship: $C_{res-p}=F_\alpha(D_{res-p})=F_\alpha(D_1 \& D_2)=F_\alpha(D_1) \& F_\alpha(D_2)=C_1 \& C_2=O_{res-t}$.

If the instruction executed in step 96 is the complement operation for the datum $D_1$, in step 98, the code $C_{res-t}$ is computed using the following relationship: $C_{res-t}$=The remainder of the method is then identical to what was described earlier. In the case of the complement operation, the codes $C_{res-p}$ and $C_{res-t}$ are identical only if the unit 10 has operated correctly. This may be demonstrated using the following relationship: $C_{res-p}=F_\alpha(D_{res-p})=F_\alpha(D_1')=F_\alpha(D_1)'=C_1'=C_{res-t}$.

In response to an execution fault being signalled, in a step 104, the microprocessor 2 implements one or more countermeasures. A wide range of countermeasures are possible. The countermeasures implemented may have very different degrees of severity. For example, the countermeasures that are implemented may range from simply displaying or simply storing an error message without interrupting the normal execution of the machine code 32 as far as definitively taking the microprocessor 2 out of service. The microprocessor 2 is considered to be out of service when it is definitively put into a state in which it is incapable of executing any machine code. Between these extreme degrees of severity, there are many other possible countermeasures, such as:

using a human-machine interface to indicate detection of the faults,
  immediately interrupting the execution of the machine code 32 and/or reinitializing it, and
  deleting the machine code 32 from the memory 4 and/or deleting the backup copy 40 and/or deleting the secret data.

SECTION IV—VARIANTS

Variants of the Function $Q_\alpha$:

In the relationship $Q_\alpha(D_i)=P \circ F_\alpha(D_i)$, the function P is not necessarily the identity function. For example, the function P is a compression function that constructs, from each of the bits of the result $F_\alpha(D_i)$, a code $C_i$ whose size, in number of bits, is less than $2^d$. The reason is that when the function P is the identity function, the size of the code $C_i$ is equal to the size of the datum D that is to say equal to $2^d$. Now, in some contexts, it is desirable to reduce the size of the code $C_i$. For example, this is desirable in order to reduce the space that it may take up in the cache memory 27. By way of illustration, to this end, the function P is the function that performs the following operations:

1) the function P divides the result $F_\alpha(D_i)$ into two blocks $p_0$ and $p_1$ of bits of the same size, then,
2) the function P performs an "EXCLUSIVE OR" between the blocks $p_0$ and $p_1$.

In this case, the size of the code $C_i$ is halved and equal to $2^{d-1}$.

Many other compression functions P are possible. For example, above operations 1) and 2) may be reiterated multiple times. Each iteration then halves the size of the code $C_i$.

In another example, in operation 1), the function P divides the result $F_\alpha(D_i)$ into g+1 blocks $p_0$ to $p_g$ of the same size, and, in operation 2), the function P performs an "EXCLUSIVE OR" between these g+1 blocks $p_0$ to $p_g$. In this case, the size of the code $C_i$ that is obtained is equal to $2^{d-g}$. The bits of each block $p_0$ to $p_g$ are not necessarily adjacent bits in the result $F_\alpha(D_i)$. Thus, more generally, the bits of each block $p_h$ are selected, among the bits of the result $F_\alpha(D_i)$, in accordance with a predefined law, where the index h is the identifier of the block $p_h$ among the blocks $p_0$ to $p_g$. For example, as a variant, one of the blocks $p_0$ to $p_g$ comprises only bits of an even rank, and another of the blocks $p_0$ to $p_g$ comprises only bits of an odd rank. The rank of a bit designates the position that it occupies in the result $F_\alpha(D_i)$, knowing that the least significant bit is the bit of rank 0, and then the following one is the bit of rank 1, and so on.

The function P may itself also be configured by one or more secret parameters $\beta_h$ known only by the security module 28. For example, when the parameter $\beta_h=0$, the order of the bits in the block $p_h$ is left unchanged and when the parameter $\beta_h=1$, the order of the bits in the block $p_h$ is reversed before performing operation 2). More generally, when the parameter $\beta_h=1$, the bits of the block $p_h$ are permuted using a predefined permutation and are not permuted when $\beta_h=0$.

Another example of a compression function P is a hash function.

The function P may also be different from the identity function and from a compression function. For example, the function P is an encryption or other function.

The various variants are described below in the particular case where the function P is equal to the identity function. However, these variants also apply to the case when the function P is different from the identity function.

As a variant, the transposition $T_{\alpha,r}$ permutes the blocs $B1_r$ and $B2_r$ when the parameter $\alpha_r=0$ and does not permute them when the parameter $\alpha_r=1$.

The blocks $B1_r$ and $B2_r$ permuted by the transposition $T_{\alpha,r}$ do not necessarily have the same size.

As a variant, the transpositions $T_{\alpha j,q}$ of one and the same stage are executed one after another. In this case, it is not necessary for the permuted blocks $B1_{j,q}$ and $B2_{j,q}$ not to overlap with other blocks permuted by other permutations of the same stage.

The sizes of the blocks $B1_{j,q}$ and $B2_{j,q}$ permuted by a transposition $T_{\alpha j,q}$ of the stage $E_q$ may be different from the sizes of the blocks permuted by another transposition of the same stage $E_q$.

The function $F_\alpha$, of FIG. 5 has been described in the particular case where the stages of transpositions first transpose the blocks of larger size and end by transposing the blocks of smaller size. However, as a variant, the stages $E_q$ of transpositions may be executed and classified in reverse order. In this case, the transpositions of smaller size are applied first, ending by applying the transposition $T_{\alpha 0, NbE-1}$ of larger size. The order in which the various stages $E_q$ are classified does not modify the bit locality property described earlier. Thus, even if the order of the stages $E_q$ is reversed, it is possible to construct fast and simple computation circuits for computing the code $C_{res-t}$ for most arithmetic operations.

As a variant, the size of the blocks $B1_{j,q-1}$ and $B2_{j,q-1}$ is more than twice as great as the size of the blocks $B1_{j,q}$ and $B2_{j,q}$ permuted by the transpositions of the lower stage. For example, for this purpose, one or more stages of the function $F_\alpha$ described with reference to FIG. 5 are omitted.

Some of the transpositions $T_{\alpha j,q}$ may be omitted. In this case, at least one of the stages comprises fewer than $2^{d-q-1}$ transpositions $T_{\alpha j,q}$.

Other Variants:

The module 28 is not necessarily a hardware module of a single block. As a variant, it is made up of multiple hardware submodules that each perform one of the specific functions of the module 28. These hardware submodules are thus preferably embedded as close as possible to the data that they process. For example, in this case, the hardware submodule that computes the code $C_i$ associated with each datum $D_i$ is embedded in the cache memory 27. From then on, the code $C_i$ associated with each datum $D_i$ stored in the cache memory 27 is computed locally in this cache memory.

As a variant, each instruction of the machine code is also associated with an integrity code $Q_\alpha(I_i)$ computed from the value of the loaded instruction $I_i$. This code $Q_\alpha(I_i)$ is checked just before the unit 10 executes the instruction $I_i$. This allows the signalling of an execution fault to be triggered if the instruction $I_i$ is modified in the queue 22.

It is possible to associate the code $C_i$ with the datum $D_i$ in various ways. For example, instead of storing the code $C_i$ in the same register $R_i$ as the one that contains the datum D the code $C_i$ is stored in a register $RC_i$ associated with the register $R_i$ rather than in the register R.

As a variant, each datum $D_i$ is a masked datum obtained by executing, beforehand, an operation of masking a cleartext datum $DC_i$ using a mask $M_D$. Here, the masking operation is performed using the following relationship: $D_i = DC_i$ XOR $M_D$. In this case, the result $D_{res-p}$ that is obtained is itself also masked using the mask $M_D$. The masked result $D_{res-p}$ is obtained directly by executing the Boolean operation on the masked data $D_i$. It is therefore not necessary to unmask these data $D_i$ before executing the Boolean operation. The code C obtained by applying the function $F_\alpha$ to the masked datum $D_i$ is itself also masked by a mask $M_C$. The mask $M_C$ is equal to the mask $F_\alpha(M_D)$. This stems from the following relationship: $F_\alpha(D_i) = F_\alpha(DC_i \text{ XOR } M_D) = F_\alpha(DC_i)$ XOR $F_\alpha(M_D) = CC_i$ XOR $M_C$, where $CC_i$ is the cleartext code $C_i$. When the datum $D_i$ and the code $C_i$ are masked, they may be stored in a memory external to the microprocessor 2 while still remaining difficult to uncover.

The secret key a may be modified, for example, at regular intervals.

Other embodiments of step 100 are possible. For example, rather than computing the code $C_{res-p}$ from the result $D_{res-p}$, the module 28 computes a result $D_{res-t}$ from the code $C_{res-t}$. The result $D_{res-t}$ is computed using the following relationship: $D_{res-t} = F_\alpha^{-1}(C_{res-t})$, where the function $F_\alpha^{-1}$ is the reciprocal of the function $F_\alpha$. In this case, the code $C_{res-t}$ corresponds to the code $C_{res-p}$ if the computed result $D_{res-t}$ is identical to the result $D_{res-p}$.

SECTION V—ADVANTAGES OF THE DESCRIBED EMBODIMENTS

Computing the code $C_i$ using a secret key a makes the method for executing the machine code more robust in the face of attempted attacks. The reason is that the attacker then has greater difficulty in falsifying the code $C_{res-t}$ so that it corresponds to an expected code when an execution fault has been deliberately introduced. Thus, the methods described earlier have the same advantages in terms of robustness as the one described in the article by DEMEYER2019. In addition, using a function $F_\alpha$ formed only of conditional transpositions makes it possible to compute the code $C_{res-t}$ simply using the relationship $C_{res-t} = C_1 \& C_2 \& \ldots \& C_n$. It is therefore far simpler to compute the code $C_{res-t}$ in the case of Boolean operations than when the method from the article DEMEYER2019 is implemented.

Distributing the transpositions $T_{\alpha j,q}$ in stage $E_q$ of transpositions able to be executed in parallel accelerates the computing of each code $C_i$.

Using only transpositions that permute blocks each only of one bit combined with the fact that the numbers m and NbE are high maximizes the entropy of the function $F_\alpha$. This therefore makes the function $F_\alpha$ more robust against attempted attacks as the number of possible values for the code C computed from the same datum $D_i$ and for all possible values of the key a, is very high.

Using a function $F_\alpha$ such as the one described with reference to FIG. 5 makes it possible to obtain a function that retains the locality of the transposed bits. By virtue of this, for operations other than Boolean operations, it is also possible to develop a simple and fast circuit that computes the code $C_{res-t}$ from the codes $C_i$. This ultimately makes it possible to further accelerate the execution of the method.

The fact that the size of the blocks permuted by a stage $E_q$ varies monotonically as a function of the order number q also makes it possible to simplify the design of computation circuits for computing the code $C_{res-t}$ or the datum $D_{res-t}$ if the instruction executed by the unit 10 performs an arithmetic operation other than a Boolean operation.

When each datum $D_i$ is the result of the masking of a cleartext datum $DC_i$ by a mask $M_D$, the result $D_{res-p}$ obtained after executing the Boolean operation is a result masked by this mask $M_D$. The mask $M_D$ is a mask known only to the microprocessor 2. The result $D_{res-p}$ that is obtained may therefore be stored directly in a memory external to the microprocessor, without this being able to reveal information about the operation of the function $F_\alpha$. Similarly, the code $C_{res-p}$ is then itself also a code masked by the mask $F_\alpha(M_D)$. From then on, the code $C_{res-p}$ may itself also be stored directly in a memory external to the microprocessor, without this constituting a security flaw. Finally, it is not necessary to unmask the data to be processed before executing Boolean operations, thereby simplifying the implementation of the method.

The fact that each transposition $T_{\alpha j,q}$ is different from all other transpositions of the function $F_\alpha$ maximizes the entropy of the function $F_\alpha$ for a given number of transpositions $T_{\alpha j,q}$. Thus, for this given number of transpositions, the function $F_\alpha$ is as robust as possible against attempted attacks.

The check that the code $C_{res-t}$ corresponds to the code $C_{res-p}$ by comparing it with the result $Q_\alpha(D_{res-p})$ makes it possible to use a function $F_\alpha$ that does not comply with the following property: $F_\alpha \circ F_\alpha(x) = x$. This therefore allows a greater possible choice for the functions $F_\alpha$. This also makes it possible to use a function P that is not reversible.

The invention claimed is:

1. A method for execution of a binary code by a microprocessor comprising an arithmetic logic unit, comprising:
   a) providing the binary code, this binary code containing:
      a logic instruction comprising an opcode and multiple operands that, when the logic instruction is executed by the arithmetic logic unit of the microprocessor, causes a Boolean operation $D_1 \& D_2 \& \ldots \& D_n$ to be performed and a result of the Boolean operation to be stored in a register $R_{res-p}$, where:
         $D_1$ to $D_n$ are data stored, respectively, in registers $R_1$ to $R_n$ of the microprocessor,
         the registers $R_1$ to $R_n$ are the registers designated by operands of the logic instruction,
         the "&" symbol is a logic operation designated by the opcode of the logic instruction, the logic operation being chosen from a group of Boolean operations,
         an index n is an integer greater than or equal to one, and
         for each register $R_1$ to $R_n$, a load instruction that, when executed by the microprocessor, causes a datum $D_i$ to be loaded to the register $R_i$, where an index i is an identifier of register $R_i$ among the registers $R_1$ to $R_n$, and b) executing the binary code using the microprocessor, comprising the following operations:

1) For each datum $D_i$, computing a code $C_i$ using a relationship $C_i=Q_\alpha(D_i)$ and associating the computed code $C_i$ with the datum $D_i$, $Q_\alpha$ being a pre-programmed function configured by a secret key a that is pre-stored in the microprocessor and known only to the microprocessor, 2) Each time an instruction for loading a datum $D_i$ into a register $R_i$ of the microprocessor is executed by the microprocessor, storing the loaded datum $D_i$ in the register $R_i$ and storing the computed code $C_i$ associated therewith in the register $R_i$ or in a register associated with the register $R_i$, then 3) executing, using the arithmetic logic unit, the logic instruction contained in the binary code and a result $D_{res-p}$ of the execution is stored in register $R_{res-p}$, 4) In parallel with operation 3) or thereafter, using a hardware security processor, computing a code $C_{res-t}$ using codes $C_1, C_2, \ldots, C_n$ and without using the result $D_{res-p}$, and then checking whether the computed code $C_{res-t}$ corresponds to a code $C_{res-p}$ defined by a relationship $Cd=Q_\alpha(D_{res-p})$ and triggers signalling of an execution fault if the code $C_{res-t}$ does not correspond to the code $C_{res-p}$ and, in an opposite case, suppresses the signalling, wherein:

the function $Q_\alpha$ is defined by a relationship: $Q_\alpha(D_i)=P \circ F_\alpha(D_i)$, where:

P is a predetermined function, $F_\alpha$ is a function defined by a relationship: $F_\alpha(D_i)=T_{\alpha t} \circ \ldots \circ T_{\alpha r} \circ \ldots \circ T_{\alpha 1} \circ T_{\alpha 0}(D_i)$, $T_{\alpha r}$ is a conditional transposition, configured by a parameter $\alpha_r$, that permutes two blocks $B1_r$ and $B2_r$ of bits of the datum $D_i$ when the parameter $\alpha_r$ is equal to a first value and that does not permute the two blocks of bits when the parameter $\alpha_r$ is equal to a second value, the permuted blocks of bits each being able to contain one or more bits, the symbol "o" designates a function-composition operation, "t" is an integer greater than one, bits of parameters $\alpha_0$ to $\alpha_t$ form the secret key $\alpha$, and in operation 4), the code $C_{res-t}$ is computed using: $C_{res-t}=C_1 \& C_2 \& \ldots \& C_n i$.

2. The method according to claim 1, wherein:

a size, in number of bits, of each of the data $D_i$ is equal to $2^d$, where d is an integer greater than two, the function $F_\alpha$ is defined by: $F_\alpha(D_i)=E_0 \circ \ldots \circ E_q \circ \ldots \circ E_{NbE-1}(D_i)$, where each function $E_q$ is a stage of transpositions and q is an order number of a stage between zero and NbE-1, where NbE is an integer greater than one, each stage $E_q$ of transpositions being defined by: $E_q(x)=T_{\alpha m,q} \circ \ldots \circ T_{\alpha j,q} \circ \ldots \circ T_{\alpha 1,q} \circ T_{\alpha 0,q}(x)$, where:

x is a variable whose size, in number of bits, is equal to the size of the datum $D_i$, $T_{\alpha j,q}$ is a conditional transposition, configured by a parameter $\alpha_{j,q}$, that permutes two blocks of bits $B1_{j,q}$ and $B2_{j,q}$ of the variable x when the parameter $\alpha_{j,q}$ is equal to the first value and that does not permute these two blocks of bits when the parameter $\alpha_{j,q}$ is equal to the second value, the transposition $T_{\alpha j,q}$ being identical to one of the transpositions $T_{\alpha r}$ defined above, the blocks of bits $B1_{j,q}$ and $B2_{j,q}$ each being able to contain one or more bits, the blocks $B1_{j,q}$ and $B2_{j,q}$ of all of the transpositions $T_{\alpha j,q}$ of the stage $E_q$ being different from one another and not overlapping such that all of the transpositions $T_{\alpha j,q}$ of the stage $E_q$ are able to be executed in parallel, "m+1" is a total number of transpositions $T_{\alpha j,q}$ of the stage $E_q$, "j" is an order number identifying the transposition $T_{\alpha j,q}$ among transpositions of the stage $E_q$, and in computing the code $C_i$ using $C_i=Q_\alpha(D_i)$, all of the transpositions $T_{\alpha j,q}$ of one and the same stage are executed in parallel.

3. The method according to claim 2, wherein:

a size of each permuted block of bits is equal to one bit, and a number of transpositions $T_{\alpha j,q}$ of each stage $E_q$ is between $2^{d-2}$ and $2^{d-1}$, and the number NbE of stages $E_q$ is greater than or equal to d.

4. The method according to claim 2, wherein all of the stages $E_q$ for which q is less than NbE-1 and for all of the transpositions $T_{\alpha j,q}$ of the stage, blocks $B1_{j,q}$ and $B2_{j,q}$ are located within one and the same block of larger size permuted by a transposition of a higher stage $E_{q+1}$ when the parameter of the transposition of the higher stage $E_{q+1}$ is equal to the first value.

5. The method according to claim 4, wherein:

sizes of the blocks $B1_{j,q}$ and $B2_{j,q}$ of all of the transpositions $T_{\alpha j,q}$ of one and the same stage $E_q$ are equal, the size of each of the blocks $B1_{j,q}$ and $B2_{j,q}$ is a multiple of two and varies monotonically as a function of the order number q of the stage $E_q$, and for each stage $E_q$, a number of transpositions $T_{\alpha j,q}$ in a stage is equal to $2^{d-1}/TB_{j,q}$, where $TB_{j,q}$ is the size of the blocks $B1_{j,q}$ and $B2_{j,q}$.

6. The method according to claim 1, wherein a function P is a compression function that constructs, from each of bits of $F_\alpha(D_i)$, a code $C_i$ whose size, in number of bits, is less than $2^d$, where $2^d$ is a size, in number of bits, of the datum $D_i$.

7. The method according to claim 1, comprising obtaining each datum $D_i$ by masking a cleartext datum $DC_i$ with a mask $M_D$, the masking consisting in performing an "EXCLUSIVE OR" between the datum $DC_i$ and the mask $M_D$.

8. The method according to claim 1, wherein each transposition $T_{\alpha r}$ is distinguished from all other transpositions of the function $F_\alpha$ since it is the only one that permutes the two blocks $B1_r$ and $B2_r$ when the parameter $\alpha_r$ is equal to the first value.

9. The method according to claim 1, wherein checking whether the computed code $C_{res-t}$ corresponds to the code $C_{res-p}$ comprises:

computing the code $C_{res-p}$ using: $C_{res-p}=Q_\alpha(Q_{res-p})$, and then comparing the computed codes $C_{res-t}$ and $C_{res-p}$, the code $C_{res-t}$ corresponding to the code $C_{res-p}$ only if these two codes are identical.

10. A hardware security processor for implementing a method according to claim 1, wherein the hardware security processor is configured to:

compute the code $C_{res-t}$ using the codes $C_1, C_2, \ldots C_n$ and without using the result $D_{res-p}$, and then check whether the computed code $C_{res-t}$ corresponds to the code $C_{res-p}$ defined by $C_{res-p}=Q_\alpha(D_{res-p})$ and trigger signalling of the execution fault if the code $C_{res-t}$ does not correspond to the code $C_{res-p}$ and, in an opposite case, suppress this signalling, wherein:

the function $Q_\alpha$ is defined by: $Q_\alpha(D_i) = P \circ F_\alpha(D_i)$, where:

P is a predetermined function, $F_\alpha$ is a function defined by: $F_\alpha(D_i) = T_{\alpha t} \circ \ldots \circ T_{\alpha r} \circ \ldots \circ T_{\alpha 1} \circ T_{\alpha 0}(D_i)$, $T_{\alpha r}$ is a conditional transposition, configured by the parameter $\alpha_r$, that permutes two blocks $B1_r$ and $B2_r$ of bits of the datum $D_i$ when the parameter $\alpha_r$ is equal to a first value and that does not permute the two blocks of bits when the parameter $\alpha_r$ is equal to a second value, the permuted blocks of bits each being able to contain one or more bits, the symbol "o" designates the function-composition operation, "t" is an integer greater than one, the bits of the parameters $\alpha_0$ to $\alpha_t$ form the secret key $\alpha$, and the hardware security processor is configured to compute the code $C_{res-t}$ using: $C_{res-t} = C_1 \ \& \ C_2 \ \& \ \ldots \ \& C_n$.

* * * * *